: US010904082B1

(12) United States Patent
Muhammad et al.

(10) Patent No.: US 10,904,082 B1
(45) Date of Patent: Jan. 26, 2021

(54) VELOCITY PREDICTION FOR NETWORK DEVICES

(71) Applicant: AMAZON TECHNOLOGIES, INC., Seattle, WA (US)

(72) Inventors: Moosa Muhammad, Seattle, WA (US); Joseph E. Magerramov, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 1128 days.

(21) Appl. No.: 14/849,135

(22) Filed: Sep. 9, 2015

(51) Int. Cl.
*G06F 15/177* (2006.01)
*H04L 12/24* (2006.01)

(52) U.S. Cl.
CPC ...... *H04L 41/0813* (2013.01); *H04L 41/0869* (2013.01)

(58) Field of Classification Search
CPC ... H04L 41/085; H04L 41/0853; H04L 41/08; H04L 41/0869; H04L 41/0813; H04L 41/0866; H04L 41/0893
See application file for complete search history.

(56) References Cited

U.S. PATENT DOCUMENTS

| 7,565,416 | B1 * | 7/2009 | Shafer | H04L 41/0813 709/203 |
| 8,949,305 | B1 * | 2/2015 | White | G06F 11/0709 709/201 |
| 2003/0131077 | A1 * | 7/2003 | Hogan | H04L 41/0813 709/220 |
| 2005/0125516 | A1 * | 6/2005 | Molnar | H04L 41/0869 709/223 |
| 2006/0031427 | A1 * | 2/2006 | Jain | H04L 41/028 709/220 |
| 2008/0281833 | A1 * | 11/2008 | Cain | G06Q 10/06 |
| 2010/0180016 | A1 * | 7/2010 | Bugwadia | G06F 9/4411 709/220 |
| 2013/0204837 | A1 * | 8/2013 | Sabharwal | G06Q 10/00 707/609 |
| 2013/0290520 | A1 * | 10/2013 | Noo | H04L 41/147 709/224 |
| 2014/0025984 | A1 * | 1/2014 | Childers, Jr. | G06F 11/1474 714/4.1 |
| 2014/0379881 | A1 * | 12/2014 | Bradley | H04L 41/0813 709/221 |

* cited by examiner

*Primary Examiner* — Cheikh T Ndiaye
(74) *Attorney, Agent, or Firm* — Thomas Horstemeyer, LLP

(57) ABSTRACT

A computing system includes one or more processors and memory that includes instructions, that when executed by the one or more processors, cause the processors to receive, by an networking device of a data interface of a computing environment, a command instruction that instructs the networking device to change state to a state corresponding with a requested state stored in a data store of a control interface of the computing environment. When implemented by the networking device, the command instruction causes the networking device to implement a network configuration option. The instructions also cause the processors to determine, by the networking device, whether the state information in the command instruction is valid by utilizing network heuristic based rules; and reject, by the networking device, the command instruction based on a determination that the state information is not valid.

18 Claims, 12 Drawing Sheets

VELOCITY PREDICTION FOR NETWORK DEVICES

BACKGROUND

Many companies and organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers have increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. In many cases, the functionality and usability of applications that run on such platforms may rely extensively on network communications with other parts of the provider network, and/or with external entities such as clients or third parties.

In many of these distributed computing networks, clients have the ability to customize the mapping of their specific network resources. For example, a client may be able to set specific subroutes, subnets, elastic Internet Protocol (IP) addresses, private IP addresses, etc. Thus, the distributed network receives the configuration data from the client. This configuration data then may be transmitted (pushed or pulled) to networking devices which implement the client's requested network configuration.

BRIEF DESCRIPTION OF THE DRAWINGS

For a detailed description of various examples, reference will now be made to the accompanying drawings in which.

DETAILED DESCRIPTION

Figure 1:
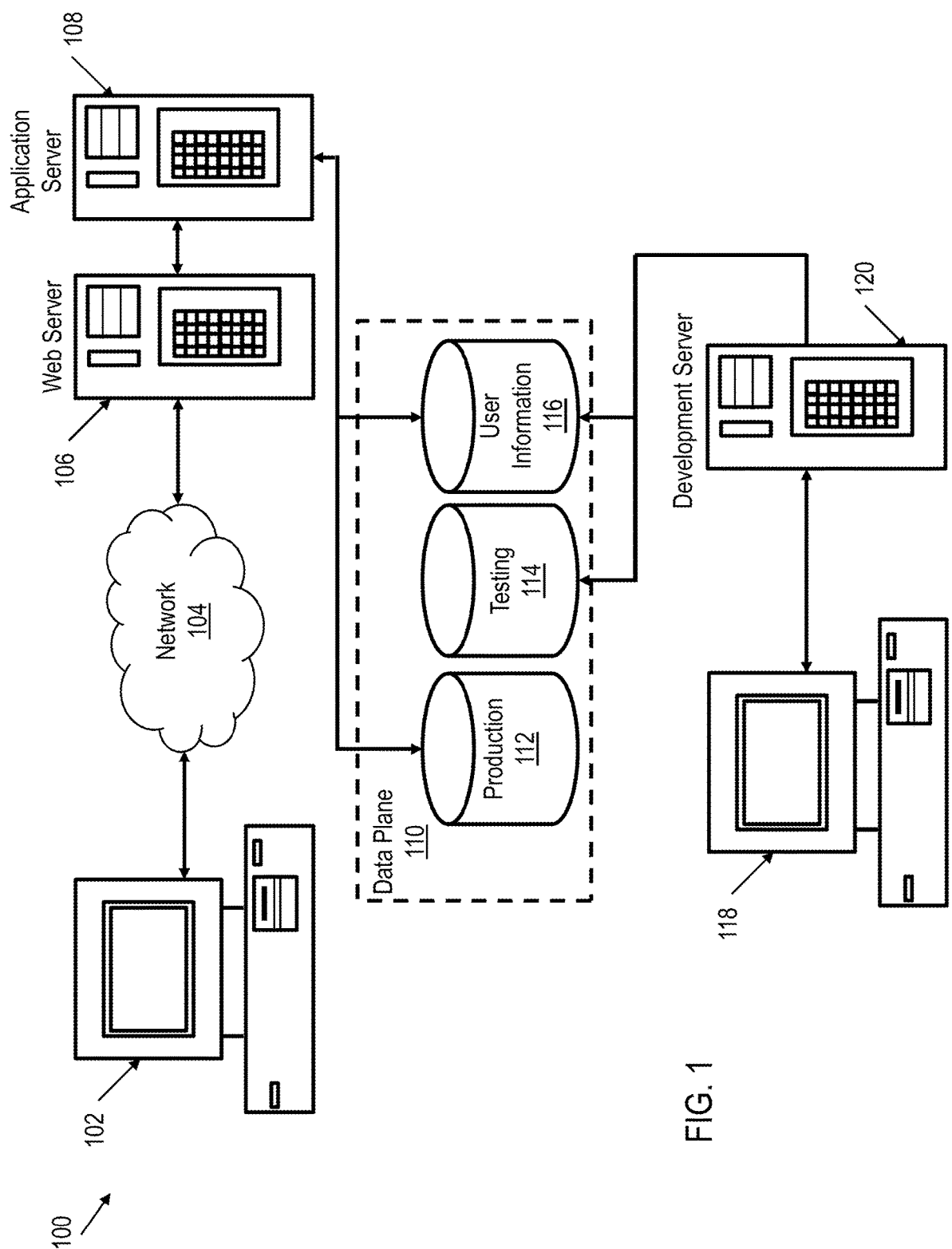
FIG. 1 shows a block diagram of a distributed computing environment, in accordance with various embodiments.

In large-scale distributed systems, clients may have the ability to customize the mapping of their specific network resources, which can be implemented in provider network as virtual networks that run over an underlying physical network. For example, a client may be able to set specific subroutes, subnets, elastic Internet Protocol (IP) addresses, private IP addresses, etc. for virtual networks. Thus, the distributed network receives such configuration data from the client. This configuration data then may be translated into configuration data to configure the underlying physical network and transmitted (pushed or pulled) to networking devices which implement the client's requested configuration. Networking devices may include routers, switches, network address translation router (NAT), integrated access devices, or any other networking infrastructure utilized for communications within the network and from and to the network. In some examples, a networking device may take the form of an edge device (i.e., a device that provides an entry point into the provider network). For example, configuration data may be transmitted to a networking device, which may cause the routing table within the networking device to be overridden with new state information corresponding to the requested network configuration. This causes the networking device to route packets to different parts of the physical network and/or onto the Internet in accordance with the client's requested configuration. However, corrupted configuration data may also be transmitted to the networking devices which may cause the devices to implement network configurations that are not intended. Therefore, it is desirable that the networking devices validate that the network configuration data that they receive is a valid network configuration request and not a corrupted network configuration request.

Various embodiments of methods and apparatus for validating networking configuration requests in a large-scale distributed system utilizing network heuristic based rules are described. In some embodiments, the networking devices, such as edge devices, comprise validation logic that acts to validate any requested changes to the state of the device. For example, if a client requests a change to its virtual network or virtual machines, the network's configuration that affects a networking device, a change in state command corresponding to the physical network to implement the network configuration associated with a client request is transmitted to the networking device. The validation logic within the networking device then determines whether the command is based on a valid request or is based on a corrupted request. The validation logic may utilize network heuristic based rules to make the validity determination.

In some embodiments, the network heuristic based rules may be based on the rate of change of state requested by the command instruction. Thus, the validation logic may compare the rate of change of state requested by the command instruction to a threshold value rate of change of state. In some embodiments, the threshold value rate of change of state is based on the historical rate of change of state for the edge device. If the rate of change of state requested by the command instruction exceeds the threshold value, the validation logic makes a determination that the command instruction is invalid and rejects the instruction. If the instruction is invalid, the networking device may not implement the state changes found in the instruction. However, if a determination is made by the validation logic that the rate of change of state is less than the threshold value, the validation logic makes a determination that the command instruction is valid, and the state changes found in the instruction are implemented. In this way, networking devices may be configured to operate in accordance with a client's configuration request while rejecting corrupted state change requests.

In much of the following description, a provider network is used as an example of a distributed system in which the centralized networking configuration techniques may be implemented. Virtual networks set up by an entity such as a company or a public sector organization to provide one or more network-accessible services (such as various types of cloud-based database, computing or storage services) accessible via the Internet and/or other networks to a distributed set of clients may be termed "provider networks" herein. At least some of the services may be packaged for client use in service units called "instances": for example, a virtual machine instantiated by a virtualized computing service may represent a "compute instance," and a storage device such as a block-level volume instantiated by a storage service may be referred to as a "storage instance." In some embodiments, instances of higher-level services may be packaged using compute instances and/or storage instances—e.g., a database instance may be built using a combination of compute and storage instances in some embodiments. Computing devices such as servers and/or storage devices at which such units of various network-accessible services of a provider network are implemented may be referred to herein as "instance hosts" or more simply as "hosts." In the remainder of this document, the term "client," when used as the source or destination of a given communication, may refer to any of the computing devices, processes, hardware modules or software modules that are owned by, managed by, or allocated to, an entity (such as an organization, a group with multiple users or a single user) that is capable of accessing and utilizing at least one network-accessible service of the provider network.

A given provider network may include numerous data centers (which may be distributed across different geographical regions) hosting various resource pools, such as collections of physical and/or virtualized computer servers, storage servers with one or more storage devices each, networking equipment and the like, needed to implement, configure and distribute the infrastructure and services offered by the provider. A number of different hardware and/or software components, some of which may be instantiated or executed at different data centers or in different geographical regions, may collectively be used to implement each of the services in various embodiments. Clients may interact with resources and services at the provider network from devices located at client-owned or client-managed premises or data centers external to the provider network, and/or from devices within the provider network. In at least some embodiments, a virtualized computing service offering various types of compute instances may be implemented within the provider network, and such compute instances may be allocated to clients. Other services of the provider network may be accessed from such compute instances as well as from external locations. It is noted that although provider networks serve as one example context in which many of the validation techniques described herein may be implemented, those techniques may also be applied to other types of distributed systems than provider networks, e.g., to large-scale distributed application environments in which different components of the applications may have time-varying bandwidth needs.

FIG. 1 illustrates an example of an environment 100 for implementing a distributed computing network in accordance with various embodiments. As will be appreciated, although a Web-based environment is used for purposes of explanation, different environments may be used, as appropriate, to implement various embodiments. The environment 100 shown includes both a testing and/or development portion (or side) and a production portion. An electronic client device 102 can include any appropriate device operable to send and receive requests, messages, or information over an appropriate network 104 and convey information back to a user of the device. For example, electronic client device 102 may transmit a client's requested network configuration data over network 104. Examples of such client devices include personal computers, mobile phones, hand-held messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment 100 includes at least one application server 108 and a plurality of resources, servers, hosts, instances, edge devices, routers, switches, data stores, other networking devices, and/or other such components defining what will be referred to herein as a data plane 110, although it should be understood that resources of this plane are not limited to storing and providing access to data. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides admission control services in cooperation with the data store, and is able to generate content such as text, graphics, audio, and/or video to be transferred to the user, which may be served to the user by the Web server in the form of HTML, XML, or another appropriate structured language in this example. In some embodiments, the Web server 106, application server 108 and similar components can be considered to be part of the data plane. The handling of all requests and responses, as well as the delivery of content between the client device 102 and the application server 108, can be handled by the Web server. It should be understood that the Web and application servers are not required and are merely example components, as structured code can be executed on any appropriate device or host machine as discussed elsewhere herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data stores of the data plane 110 can include several separate data tables, databases, or other data storage mechanisms and media for storing data relating to a particular aspect. For example, the data plane illustrated includes mechanisms for storing production data 112 and user information 116, which can be used to serve content for the production side. The data plane also is shown to include a mechanism for storing testing data 114, which can be used with the user information for the testing side. It should be understood that there can be many other aspects that may need to be stored in a data store, such as for page image information and access right information, which can be stored in any of the above listed mechanisms as appropriate or in additional mechanisms in the data plane 110. The data plane 110 is operable, through logic associated therewith, to receive instructions from the application server 108 or development server 120, and obtain, update, or otherwise process data, instructions, or other such information in response thereto. In one example, a user might submit a search request for a certain type of item. In this case, components of the data plane might access the user information to verify the identity of the user, and access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for various content providers or other such entities, wherein multiple hosts and various types of resources might be used to perform tasks such as serving content, authenticating users, allocating resources, or performing any of a number of other such tasks. Some of these hosts may be configured to offer similar functionality, while other servers might be configured to perform at least some different functions. The electronic environment in such cases might include additional components and/or other arrangements, such as those illustrated in the configuration 200 of FIG. 2, discussed in detail below.

Systems and methods in accordance with one embodiment provide at least one resource access gateway, or control plane, either as part of the data environment or in a path between the user and the data plane, that enables users and applications to access shared and/or dedicated resources, while allowing customers, administrators, or other authorized users to allocate resources to various users, clients, or applications and ensure adherence to those allocations. Such functionality enables a user to perform tasks such as storing, processing, and querying relational data sets in a cloud without worry about latency degradation or other such issues due to other users sharing the resource. Such functionality also enables guest users to obtain access to resources to perform any appropriate functionality, such as to render and/or serve streaming media or perform any of a number of other such operations. While this example is discussed with respect to the Internet, Web services, and Internet-based technology, it should be understood that aspects of the various embodiments can be used with any appropriate resources or services available or offered over a network in an electronic environment. Further, while various examples are presented with respect to shared access to disk, data storage, hosts, and peripheral devices, it should be understood that any appropriate resource can be used within the scope of the various embodiments for any appropriate purpose, and any appropriate parameter can be monitored and used to adjust access or usage of such a resource by any or all of the respective users.

A resource gateway or control plane 208 can be used in some environments to provide and/or manage access to various resources in the data plane 232. In a cloud computing environment, this can correspond to a cloud manager 210 or similar system that manages access to the various resources in the cloud. In one embodiment, a set of application programming interfaces (APIs) 220 or other such interfaces are provided that allow a user or customer to make requests for access to various resources. Additionally, the APIs 220 allow a user, through client 202, to make network configuration requests. For example, a user may request specific network mapping, subroutes, subnets, elastic IP addresses, private IP addresses, etc. Once access is established, a resource is allocated, etc., a user can communicate directly with the resource to perform certain tasks relating to that resource, such as data storage or processing. The user can use direct interfaces or APIs to communicate with the data instances, hosts, or other resources once access is established, but uses the control plane component(s) to obtain the access.

Figure 2:
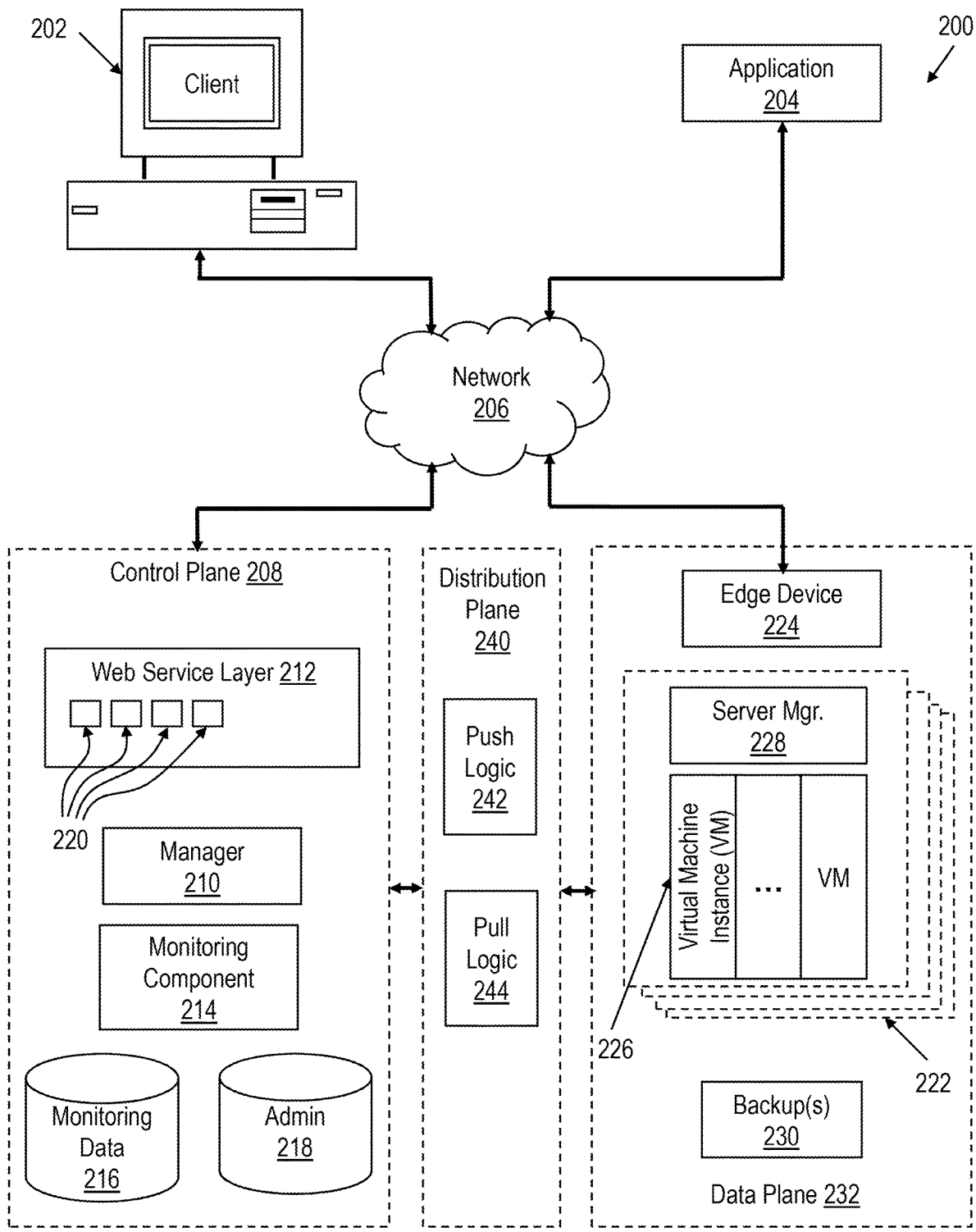
FIG. 2 shows a block diagram of an environment for providing access to various resources in a distributed computing environment, in accordance with various embodiments.

FIG. 2 illustrates an example of a configuration 200, such as may include a cloud computing manager system that can be used in accordance with various embodiments. In this example, a computing device 202 for an end user is shown to be able to make calls through a network 206 to a control plane 208 (or other such access layer) to perform a task such as to obtain access to a specified resource or resource type and/or to request a specific network configuration. While an end user computing device and application are used for purposes of explanation, it should be understood that any appropriate user, application, service, device, component, or resource can access the interface(s) and components of the connection component and data environment as appropriate in the various embodiments. Further, while certain components are grouped into a data, control, and distribution "plane," it should be understood that this can refer to an actual or virtual separation of at least some resources (e.g., hardware and/or software) used to provide the respective functionality. Further, the control plane 208 can be considered to be part of the data plane 232 and/or distribution plane 240 in certain embodiments. While a single control plane is shown in this embodiment, there can be multiple instances of control or access management components or services in other embodiments. A control plane can include any appropriate combination of hardware and/or software, such as at least one server configured with computer-executable instructions. The control plane also can include a set of APIs 220 (or other such interfaces) for receiving Web services calls or other such requests from across the network 206, which a Web services layer 212 can parse or otherwise analyze to determine the steps or actions needed to act on or process the call. For example, a Web service call might be received that includes a request for a specific network mapping as part of a network configuration option. In this example, the Web services layer can parse the request to determine the type of connection or access needed, the appropriate type(s) of resource needed, or other such aspects.

The control plane can include one or more resource allocation managers 210, each responsible for tasks such as validating the user or client associated with the request and obtaining or allocating access to the appropriate resource(s). Such a system can handle various types of requests and establish various types of connections. Such a system also can handle requests for various types of resources, such as specific graphic processors or other types of hardware or hardware functionality, and can provide access to the appropriate resource(s). Components of the data plane 232, or the resource layer of the service provider environment, can perform the necessary tasks to allocate virtual machine instances 226 in response to customer requests. For allocation of an instance, for example, the manager 210 can be configured to provision an instance (e.g., a virtual machine) by selecting a host, such as server 222, to run the instance, sending a command to a server manager 228 (e.g., virtualization system such as a hypervisor), to launch the instance, and any other set-up operations, such as allocating a volume of off-instance persistent storage, attaching the persistent storage volume to the instance, and allocating and attaching a public IP address, network interface, or other address, port, interface, or identifier for the instance. For tasks such as obtaining processing of an instruction using a particular type of hardware, for example, the components of the data plane 232, in conjunction with the control plane 208, can perform actions such as provisioning a device for a user and providing shared and/or dedicated access to the resource for a period of time at a particular level of access to the resource. In this example, a user can be provided with an IP address and a port address to be used to access a resource. A user then can access the resource directly using this IP address and port, without having to access or go through the control plane 208.

The control plane 208 in this embodiment also includes at least one monitoring component 214. When a virtual machine instance or other resource is allocated, created, or otherwise made available in the data plane, information for the resource can be written to a data store accessible to the control plane, such as a monitoring data store 216. Additionally, whenever a user requests implementation of a network configuration, monitoring data store 216 stores specific state information for each of the devices needed to implement the requested network configuration. It should be understood that the monitoring data store can be a separate data store or a portion of another data store. A monitoring component 214 can access the information in the monitoring data store 216 to determine information such as the historical usage of resources by various users, historical network configurations implemented by various users, historical state information for particular networking devices, a current number or type of threads or resources being allocated to a user, and other such usage information. A monitoring component 214 also can submit calls into components of the data environment to determine information such as the number of active connections for a given user in the data environment and aspects about the usage of each connection. A monitoring component can constantly (e.g., repeatedly) monitor the usage of each resource by a user, client, etc., having an allocation provided through the connection manager. A monitoring component also can access information stored in an administrative ("Admin") or similar data store 218, which can store information such as the general allocation granted to a user, throttling or limiting information for a user, resource permissions for a user, or any other such information that can be specified and/or updated by an administrator or other such user.

The monitoring component 214 can communicate periodically with each server manager 228, to determine status information such as load, usage, capacity, etc. This information can be used to update monitoring data 216 to indicate that each instance is still operating. In various embodiments, as discussed, the data plane takes the form of (or at least includes or is part of) a service provider environment, or a set of Web services and resources that provides data storage and access across a network of hardware and/or software components. An IP address derived from DNS mappings is beneficial in such a service provider environment, as instance or availability failures, for example, can be masked by programmatically remapping the IP address to any appropriate replacement instance for a use. A request received from a user 202 or application 204, for example, can be directed to an edge device 224 or any other networking device, such as a network address translation (NAT) router, or other appropriate component, which can direct the request to the actual resource, such as server 222 or server corresponding to the mapped address of the request. Such an approach allows for instances to be dynamically moved, updated, replicated, etc., without requiring the user or application to change the IP address or other address used to access the instance because the service provider environment is operable to updating routing tables in networking devices in the provider network to reflect the change in the IP address. In some cases, an instance can have at least one backup instance 230 or copy in persistent storage. An "edge device" as used herein can refer to any device in hardware and/or software capable of receiving a packet of information from outside the provider network, and/or capable of transmitting a packet of information from inside the provider network. For example, any device that is capable of receiving and/or transmitting a packet of information from data plane 232 to client 202 is an edge device.

The environment 200 may also include a distribution plane 240 which supports communications from control plane 208 to the data plane 232. While shown separately, distribution plane 240 may be integrated into control plane 208 and/or data plane 232. In this configuration, distribution plane 240 may enable communications of state information needed to implement a client's network configuration option that is stored in monitoring data store 216 from control plane 208 to edge device 224 in data plane 232. Distribution plane 240 may include push logic 242 and pull logic 244.

Push logic 242 is hardware and/or software that causes control plane 208 to periodically transmit or "push" data stored in a data store to data plane 232. For example, push logic 242 may cause control plane 208 to push state information stored in monitoring data store 216 and corresponding to a client's networking configuration option to edge device 224 every 10 seconds. Alternatively, push logic 242 may cause control plane 208 to push data stored in a data store to data plane 232 in response to an event. For example, push logic 242 may cause control plane 208 to push state information stored in monitoring data store 216 and corresponding to a client's networking configuration option to edge device 224 every time that the stored state information changes. Thus, in some embodiments, if a user of client 202 enters network configuration data which, if implemented would alter the state of edge device 224, the state information stored in monitoring data store 216 will change. This may cause push logic 242 to push the updated state information to edge device 224.

Pull logic 244 is hardware and/or software that causes control plane 208 to transmit data stored in a data store to data plane 232 in response to a request from data plane 232. For example, edge device 224 may request state information stored in monitoring data store 216. In response to the request, pull logic 244 will "pull" the state information from monitoring data store 216 and provide that information to edge device 224.

Figure 3:
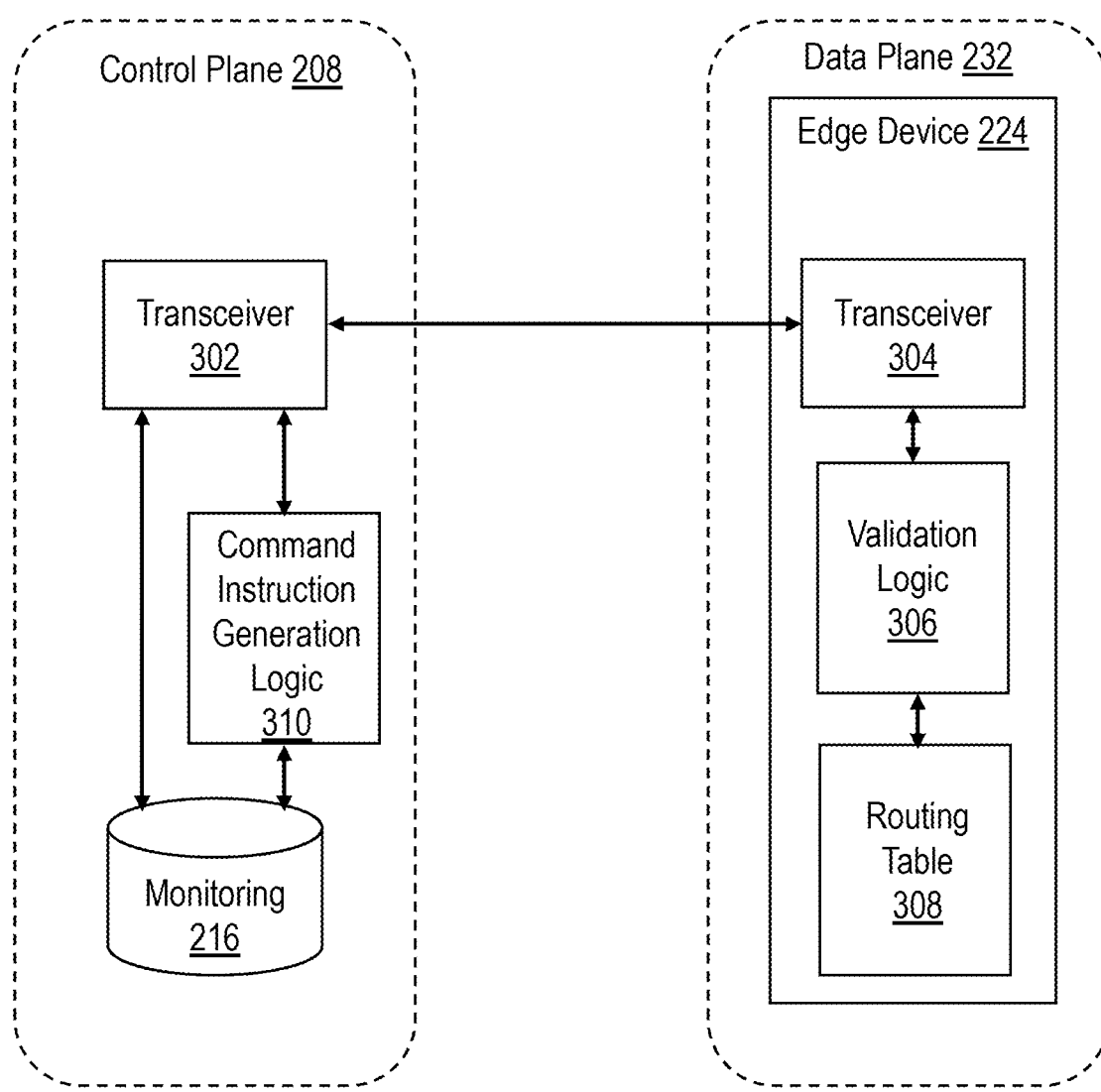
FIG. 3 shows an example of an interaction between a control plane and a data plane in a distributed computing environment, in accordance with various embodiments.

FIG. 3 shows an example of an interaction between control plane 208 and data plane 232 in a distributed computing environment, in accordance with various embodiments. While not shown in FIG. 3, in some embodiments, distribution plane 240 may enable these interactions. As noted previously, control plane 208 may include monitoring data store 216. Additionally, control plane 208 may include transceiver 302 and command instruction generation logic 306. Transceiver 302 is configured to transmit and receive communications from and to the control plane 208. Transceiver 302 may be any type of transceiver including a wired and/or wireless transceiver. More specifically, transceiver 302 may be a medium attachment unit (MAU), a gigabit interface converter (GBIC), a small form-factor pluggable (SFP), an enhanced small form-factor pluggable (SFP+), a ten gigabit small form factor pluggable (XFP), a ten attachment unit interface (XAUI), a c form-factor pluggable (CFP), and/or any other device that is capable of transmitting and receiving data communications.

Command instruction generation logic 310 may be hardware and/or software that generates a command instruction that instructs the edge device 224 to change state to a state corresponding with the state information stored in monitoring data store 216. For example, a client may request a specific network configuration. The control plane 208 then stores state information for a networking device, (e.g., edge device 224) that corresponds to the network configuration associated with the client request in monitoring data store 216. In other words, in order to implement the network configuration associated with the client request, the networking device must be placed into a certain state. The state that the networking device must be placed in order to implement the network configuration associated with the client request is stored in monitoring data store 216. Command generation logic 310 generates a command instruction that instructs the networking device to configure itself to the state corresponding to the network configuration associated with the client request that is stored in monitoring data store 216. For example, the network configuration associated with the client request may require that edge device 224 alter its state (i.e., the stored information within edge device 224 at a given instant in time). The command generation logic 310 then may generate a command instruction. The command instruction may contain the information or state that the edge device 224 needs to implement the network configuration request. Thus, in an example, the command instruction may contain an instruction for the edge device 224 to route specific packets utilizing a certain mapping. Thus, in this example, the command instruction may contain a request to change an elastic IP address or a private IP address in the edge device 224. Transceiver 302 transmits the command instruction to the edge device 224 in the data plane 232. In some embodiments, the transmission of the command instruction is enabled utilizing distribution plane 240.

In alternative embodiments, the networking device (e.g., edge device 224) may directly receive from control plane 208 and host the client input data. For example, instead of, or in conjunction with receipt of a command instruction from command instruction generation logic 310, edge device 224 may receive the network configuration option associated with the client request or state information required to implement the network configuration associated with the client request. In this example, after being stored in monitoring data store 216, the state information is directly transmitted by transceiver 302 in control plane 208 to transceiver 304 in edge device 224.

Data plane 232 may include edge device 224. While in this example edge device 224 is the networking device to be configured, in alternative examples, other networking devices may be required. Edge device 224 may include transceiver 304, validation logic 306, and routing table 308. Transceiver 304 is configured to transmit and receive communications from and to the edge device 224. Like transceiver 302, transceiver 304 may be any type of transceiver including a wired and/or wireless transceiver. More specifically, transceiver 304 may be a medium attachment unit (MAU), a gigabit interface converter (GBIC), a small form-factor pluggable (SFP), an enhanced small form-factor pluggable (SFP+), a ten gigabit small form factor pluggable (XFP), a ten attachment unit interface (XAUI), a c form-factor pluggable (CFP), and/or any other device that is capable of transmitting and receiving data communications. Transceiver 304 may be configured to receive the command instruction or client input data from the control plane 208.

Because the command instruction or client input data may contain corrupted state information, validation logic 306 may validate the state information contained in the command instruction prior to the edge device 224 changing its state to the state provided in the command instruction or client input data. Validation logic 306 may be any hardware and/or software capable of providing the validation. For example, after the edge device 224 receives the command instruction from control plane 208, the command instruction is sent to the validation logic 306. The validation logic 306 utilizes network heuristic based rules to validate the command instruction. In other words, the validation logic 306 utilizes network heuristic based rules to determine whether to allow edge device 224 to alter its state to the state found in the command instruction. If the validation logic 306 determines that the state information in the command instruction complies with the network heuristic based rules, the edge device's 224 state then may be altered by amending the routing information contained in routing table 308 such that data packets are routed in accordance with the client's requested network configuration.

However, if the validation logic 306 determines that the state information in the command instruction fails to comply with the network heuristic based rules, the edge device 224 may reject the command instruction. In other words, if the validation logic 306 determines that the state information in the command instruction fails to comply with the network heuristic based rules, the edge device 224 does not implement the state changes requested in the command instruction. In this case, the edge device 224 may maintain its state at the state the edge device 224 was in immediately prior to receiving the command instruction. In alternative embodiments, the edge device 224 may remove itself from service in the network. In other words, the edge device 224 may prevent itself from servicing any new requests.

The network based heuristic rules may be based on the historical velocity of state change requested of the edge device 224. In other words, the network based heuristic rules may be based on the historical rate of change for the state of the edge device 224. Therefore, validation logic 306 may determine that the command instruction is valid if the rate of change in state at the edge device 224 is less than a threshold value. This historical rate of change in state may be stored in monitoring data store 216 and communicated to edge device 224 utilizing transceivers 302-304. For example, after the validation logic 306 receives the command instruction, it may compare the current rate of change in state requested in the command instruction to a threshold value that is based on the historical rate of change in state of the edge device 224. In some embodiments, the current rate of change in state is the change in state for a specific period of time to the present (e.g., from twenty minutes prior to the present to the present). If the rate of change in state requested in the command instruction exceeds the threshold value, the validation logic 306 will reject the command instruction. If the rate of change in state requested in the command instruction is less than the threshold value, the validation logic 306 validates the command instruction and the networking configuration option associated with a client request is implemented.

As discussed above, the threshold value of the network based heuristic rules may be based on the historical rate of change for the state of the edge device 224. For example, if the state of edge device 224 historically changes once every twenty minutes, the threshold value of the network based heuristic rules may be set to a rate of change of twenty minutes. If the rate of change for the state of edge device 224 exceeds this threshold rate of change of state once every twenty minutes, then the validation logic 206 will reject the command instruction. For instance, if the state change immediately prior to the current request found in the command instruction was ten minutes prior to receipt of the command instruction, then the rate of change would exceed the threshold rate of change of state of once every twenty minutes, and the command instruction would be rejected.

In addition to, or instead of, being based on the historical rate of change for the state of the edge device 224, the threshold value of the network based heuristic rules may be based on which of a plurality of clients has requested the change in network configuration. For example, many different clients may have access to the distributed computing environment 100. Each client may have a different historical rate of change for the state of the edge device 224. Therefore, the threshold value of the network based heuristic rules may vary based on which client has requested a change in network configuration. Additionally, the threshold value of the network based heuristic rules may be based on which of a plurality of types of network configuration options a customer requests to change. For example, as mentioned previously, a client may make network configuration changes to different types of networking information such as subroutes, subnets, elastic IP addresses, private IP addresses, etc. Each of these different types of networking information may have its own threshold value. Therefore, the threshold value may be one rate of change for the rate of change of subnets and a second threshold value for the rate of change in elastic IP addresses.

Figure 4:
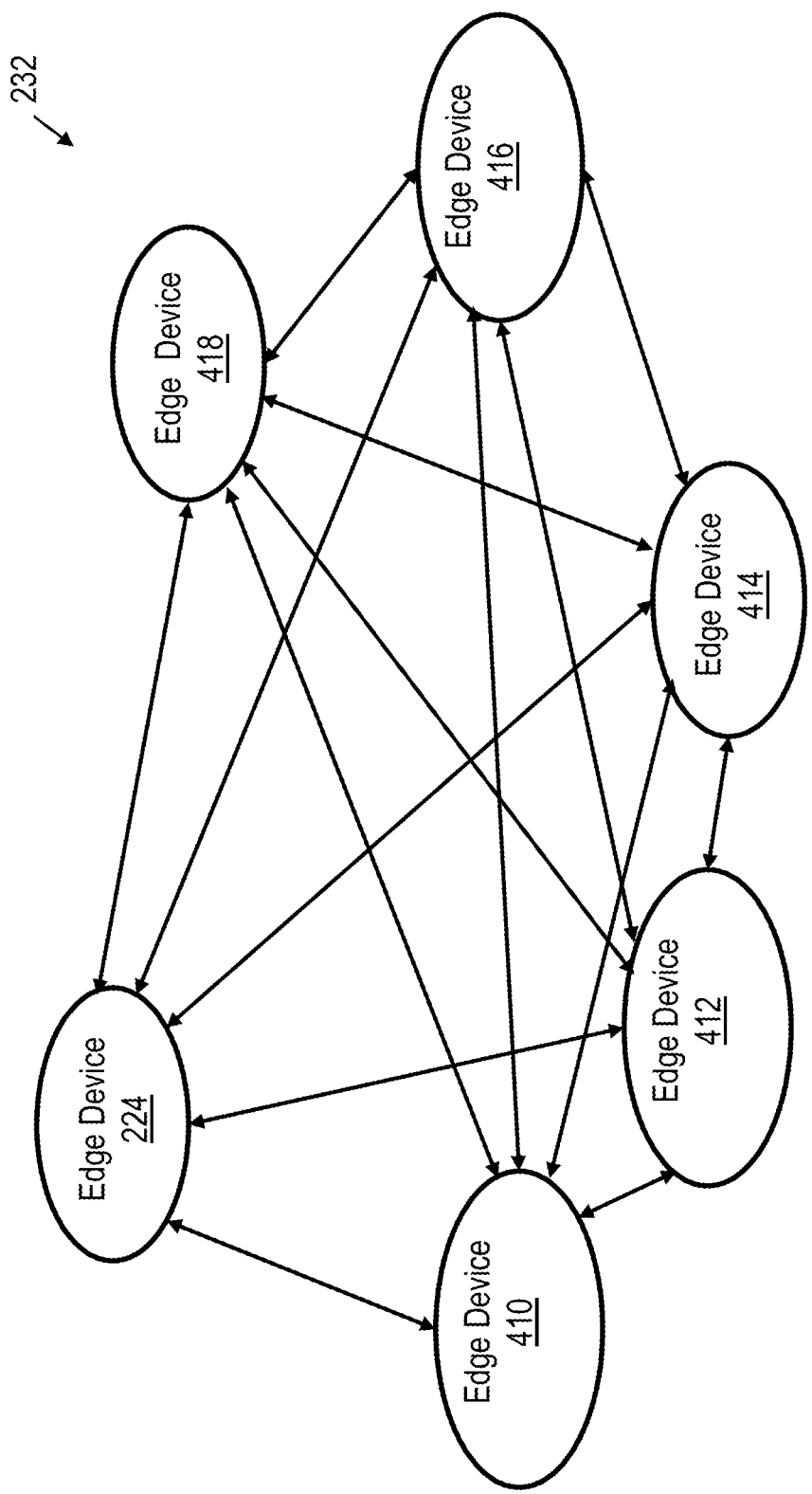
FIG. 4 shows an example of various edge devices and their communications with each other in a data plane of a distributed computing environment, in accordance with various embodiments.

FIG. 4 shows an example of various edge devices 224 and 410-418 and their communications with each other in a data plane 232 of a distributed computing environment, in accordance with various embodiments. As shown in FIG. 4, in addition to edge device 224, data plane 232 may also include a plurality of additional edge devices such as edge devices 410-418. In some embodiments, each edge device may communicate directly with all of the remaining edge devices. For example, edge device 224 may communicate directly with edge devices 410-418. Therefore, in these embodiments, edge device 224 may transmit and receive from edge devices 410-418 data transmissions. In alternative embodiments, each edge device may be able to communicate directly with certain other edge devices, but not all edge devices. For example, edge device 224 may be able to directly communicate with edge devices 410-416 but not with edge device 418. In these embodiments, one edge device may "relay" communications between edge devices that cannot communicate directly. For example, if edge device 224 cannot directly communicate with edge device 418, then edge device 224 may communicate with edge device 416 which may relay those communications to edge device 418. In yet another embodiment, certain edge devices are not able to communicate directly with any other edge device.

In embodiments in which the edge devices 224 and 410-418 may communicate with each other, the edge devices may communicate network heuristics between one another. For example, edge device 224 may send to and receive from edge devices 410-418 network heuristic data. The network heuristic data that is communicated amongst the edge devices 224 and 410-418 may include the rate of change of state for each respective edge device and their current state. Because the control plane 208 may propagate data to each of edge devices 224 and 410-418 at different points in time, each edge device captures unique heuristics depending on the frequency data is propagated from the control plane 208 to each edge device. Due to these communications, the edge devices 224 and 410-418 may share the heuristic information with each other. Additionally, if one of the edge devices, such as edge device 224, makes a determination that a command instruction is invalid, it may communicate that it has received an invalid command instruction to the other edge devices, such as edge devices 410-418.

As discussed above, the threshold value of the network based heuristic rules may be based on the rate of change of state for each of edge devices 224 and 410-418 that each edge device receives in isolation. Additionally, the threshold value of the network based heuristic rules may be based on network based heuristics of other edge devices. For example, the threshold value for rate of change of state of edge device 224 may be based on the rate of change of state for edge devices 410-418. Thus, validation logic 306 may compare the rate of change of state from the command instruction to the rate of change of state in the edge devices 410-418. If the rate of change of state exceeds the rate of change of state in the edge devices 410-418, then validation logic 306 may reject the command instruction. However, if the rate of change of state is less than the rate of change of state in the edge devices 410-418, then validation logic 306 may implement the state change requests in the command instruction.

Figure 5A:
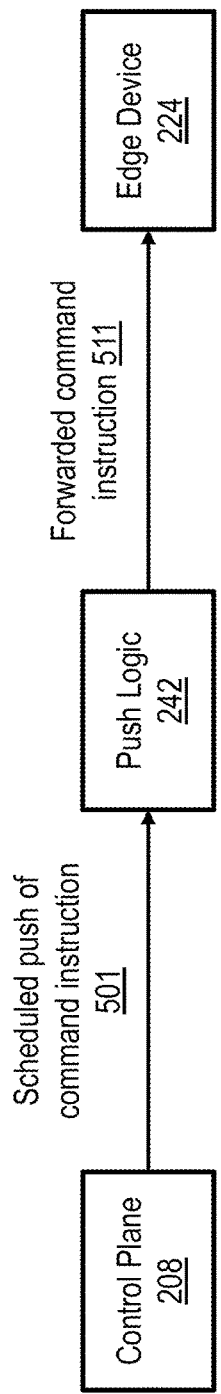
FIG. 5a-c show respective examples of protocols that may be used to transmit command instructions from a control plane to a data plane utilizing a distribution plane in a distributed computing environment, in accordance with various embodiments.

In the embodiment shown in FIG. 5a, command instructions may be sent to edge device 224 (or to edge devices 410-418) via scheduled "push" operations 501 initiated by the control plane 208. For example, control plane 208 may be configured with a schedule according to which the control plane 208 is to send command instructions to a given edge device (e.g., once every ten seconds, or once every five seconds). The actual times at which the command instruction is sent in some implementations to different targets from the control plane 208 may be staggered to avoid network congestion caused by the command instruction transfer itself. For example, if the command instruction is to be pushed once every ten seconds to six edge devices from a control plane 208, the control instruction transmission to each of the edge devices may be scheduled one second apart. In some embodiments, the scheduled push 501 is transmitted to push logic 242 in distribution plane 240. Push logic 242 then may forward the command instruction 511 to edge device 224. In alternative embodiments, the command instruction 501 may be transmitted directly to edge device 224 without utilizing push logic 242.

Figure 5B:
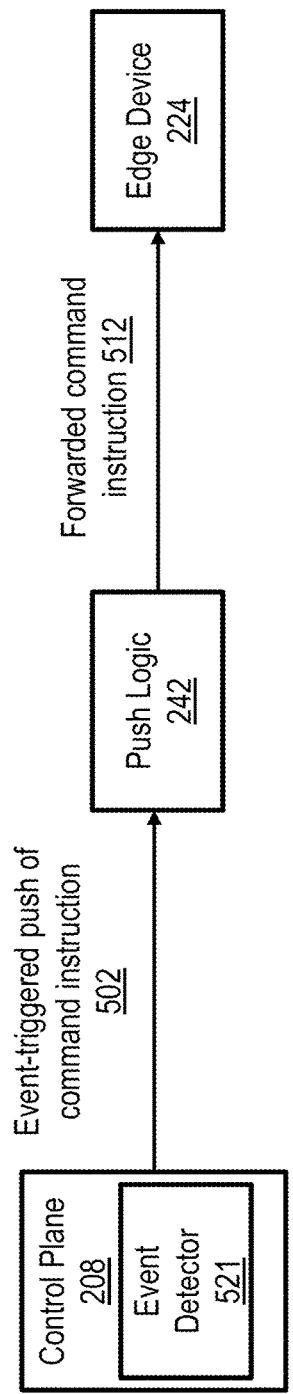

In the embodiment shown in FIG. 5b, triggering events may lead to a command instruction being transmitted. For example, an event detector 521, which in some embodiments resides within control plane 208, may determine that a new network configuration option is associated with a client request. More specifically, the event detector 521 may detect that the state information stored in monitoring data store 216 corresponding to a network configuration option has changed due to client requesting a specific network configuration. Once the event detector 521 makes this determination, it may notify the control plane 208 that this event has occurred, and the control plane 208 may then generate an appropriate command instruction to implement the networking configuration option by requesting alterations of state in one or more edge devices 224, 410-418. In some embodiments, the triggered push 502 of the generated command instruction may be initiated at a high priority as soon as the command instruction is generated in some embodiments, in an attempt to respond as quickly as possible to the event. The triggered push 502, in some embodiments, is transmitted to push logic 242 in distribution plane 240. Push logic 242 then may forward the command instruction 512 to edge device 224. In alternative embodiments, the triggered push 502 may be submitted directly to edge device 224 without utilizing push logic 242.

Figure 5C:
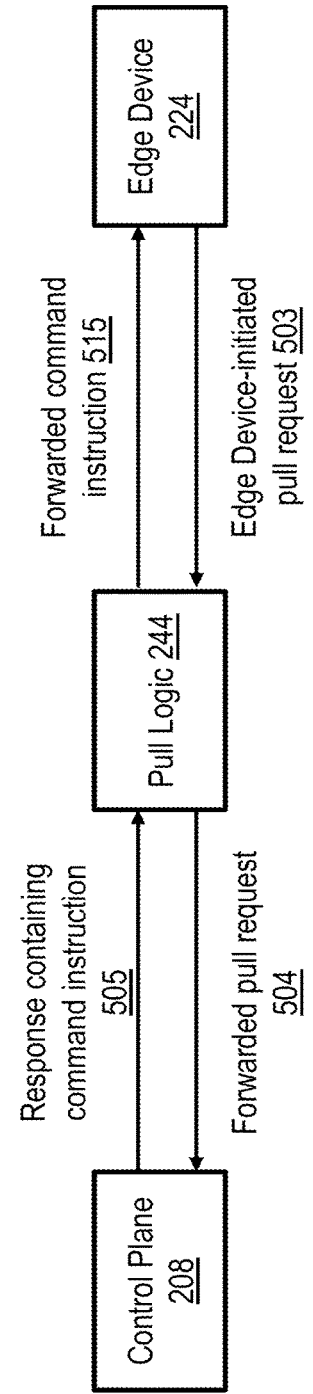

In the embodiment depicted in FIG. 5c, the edge device 224 may submit a pull request 503 to the control plane 208, in some embodiments utilizing pull logic 244 from the distribution plane 240 for the most recent state information. Pull logic 244 may then forward the pull request 504 to control plane 208 and the command instruction carrying the state information may accordingly be sent to the edge device 224 in the response 505 utilizing pull logic 244. Pull logic 244 then may forward the command instruction 515 to the edge device 224. In alternative embodiments, pull request 503 may be submitted directly to control plane 208 and the response 505 may be submitted directly to edge device 224 without utilizing pull logic 244.

In various embodiments, combinations of any of the three approaches illustrated in FIG. 5a-5c may be used. In at least one embodiment, a differential approach may be used when transmitting a command instruction—that is, a representation of only the differences between the current state information and the most-recently provided state information may be sent to an edge device. In other embodiments, the entire state information may be transmitted in each transfer.

Figure 6:
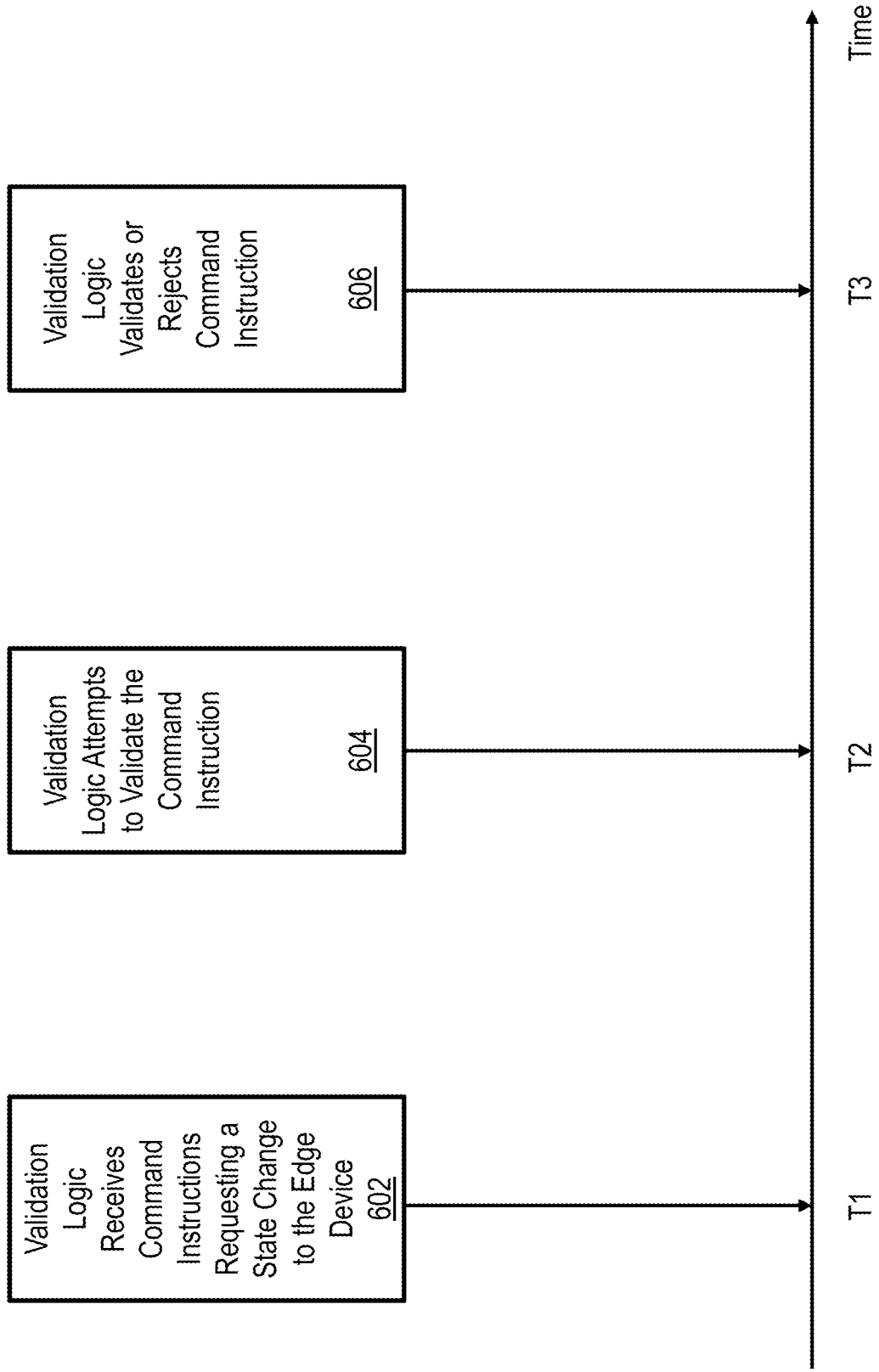
FIG. 6 shows an example responsiveness metric that may be utilized to validate a command instruction transmitted from a control plane to a data plane in a distributed computing environment, in accordance with various embodiments.

An example timeline is shown in FIG. 6, in which the time value increases from the left to right. At time T1, as indicated by block 602, validation logic, such as validation logic 306 which may reside in edge device 224, receives a command instruction from a control plane, such as control plane 208, requesting a state change for the edge device. As discussed previously, in alternative embodiments, validation logic 306 may also receive client input data directly from the control plane 208 in addition to or instead of the command instruction. As indicated by block 604, the validation logic may attempt to validate the command instruction and/or client input data at time T2 in the depicted timeline. For example, the validation logic may compare the rate of change of state requested in the command instruction to a threshold value of rate of change of state.

The validation logic then either validates or rejects the command instruction, which is shown at time T3 in the example timeline of FIG. 6, as indicated by block 606. For example, the validation logic may reject the command instruction if the rate of change of state requested in the command instruction exceeds a threshold value of rate of change of state. However, the validation logic may validate the command instruction if the rate of change of state requested in the command instruction is less than the threshold value of rate of change of state.

Figure 7:
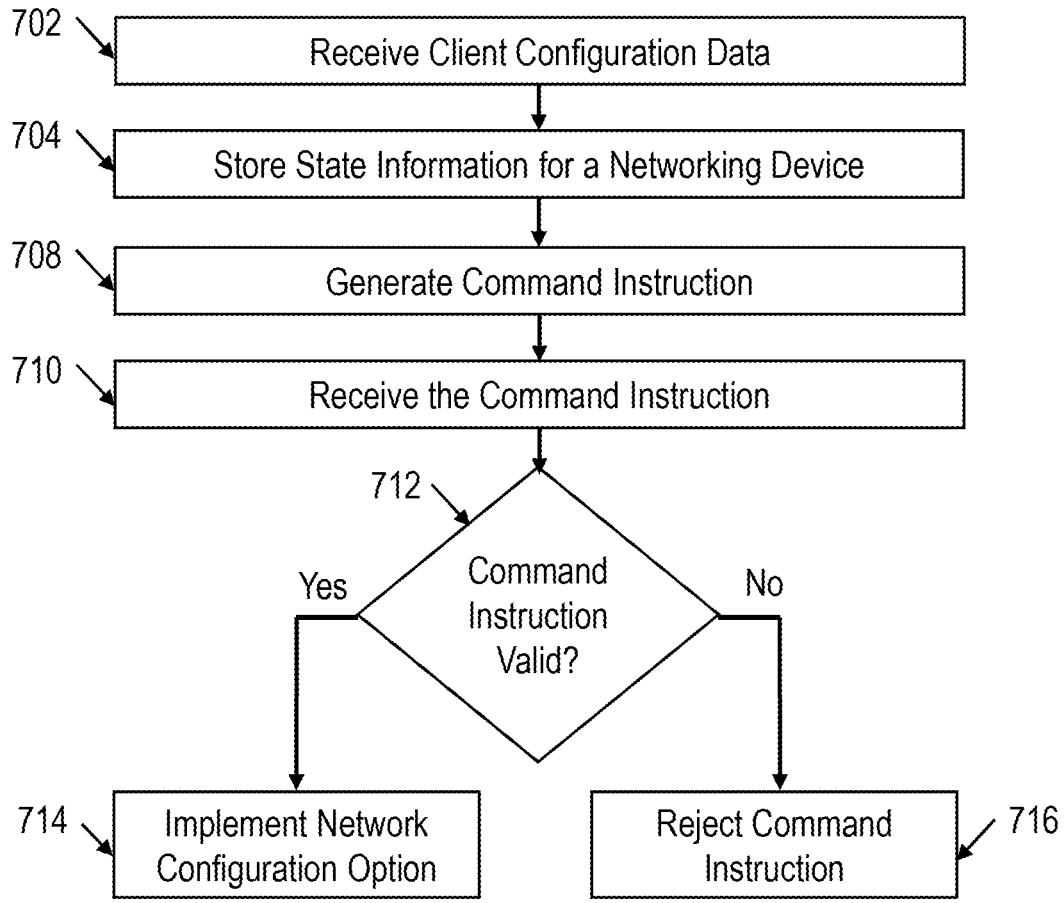
FIG. 7 shows a flow diagram illustrating aspects of operations that may be performed to implement a client's network configuration request in a distributed computing environment, in accordance with various embodiments.

FIG. 7 is a flow diagram illustrating aspects of operations that may be performed to implement customer configuration data in a distributed computing environment, in accordance with various embodiments. As shown in element 702, client configuration data is received. The client configuration data may include a network configuration that a client requests be implemented. For example, the network configuration data may include subroutes, subnets, DNS mappings, elastic IP addresses, private IP addresses, etc. that the client requests be implemented in a distributed computer network. The client configuration data may be received by a control plane of the distributed computer network. In element 704, state information that corresponds to the client configuration data is stored. The state information may include a specific state for a networking device, such as an edge device, in a data plane of the distributed computer network, that when implemented by the networking device, implements the network configuration associated with the client request. The state information may be stored in a data store of the control plane.

In element 708, a command instruction is generated. The command instruction may be generated by the control plane and may instruct the networking device to change state to a state corresponding to the state information that is stored in the data store. Thus, if implemented, the command instruction would cause the networking device to implement the network configuration associated with the client request. In element 710, the command instruction is received by the networking device.

In element 712, a determination is made as to whether the command instruction is valid. If, in element 712, a determination is made that the command instruction is valid, then the method continues in element 714 with implementing the network configuration associated with the client request. In other words, if a determination is made that the command instruction is valid, the command instruction is implemented causing the state of the networking device to change to a state corresponding with the network configuration associated with the client request. However, if, in element 712, a determination is made that the command instruction is not valid, then the method continues in element 716 with rejecting the command instruction. In some embodiments, a rejection of the command instruction causes the networking device to maintain its state at the state the networking device was in immediately prior to receiving the command instruction. In alternative embodiments, the networking device may remove itself from service in the network.

Figure 8:
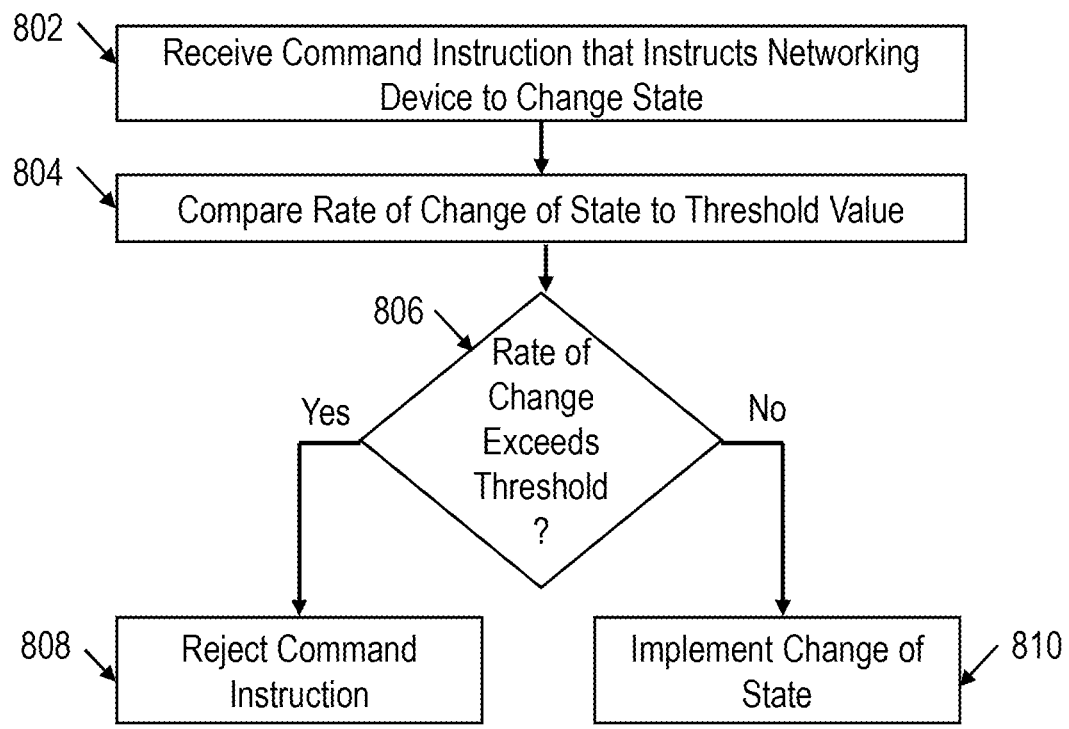
FIG. 8 shows a flow diagram illustrating aspects of operations that may be performed to implement a command instruction transmitted from a control plane to a data plane in a distributed computing environment, in accordance with various embodiments.

FIG. 8 shows a flow diagram illustrating aspects of operations that may be performed to implement a command instruction transmitted from a control plane to a data plane in a distributed computing environment, in accordance with various embodiments. In element 802, a command instruction that instructs a networking device, such as an edge device, to change state is received. The command instruction may be received by the networking device of a data plane of a distributed network environment from a control plane of the distributed network environment. The command instruction may instruct the networking device to change state to a state corresponding to state information that is stored in the data store of the control plane. In element 804, the rate of change of state that is being requested in the command instruction is compared to a threshold value. In some embodiments, this comparison is performed by validation logic within the networking device. The threshold value may be based on the historical rate of change of state for the networking device. The threshold value may also be based on which of a plurality of clients requests a change in state for the networking device and/or which of a plurality of types of network configurations a customer requests to be changed.

In element 806, a determination is made as to whether the rate of change of state being requested in the command instruction exceeds the threshold value. In some embodiments, this determination is made by validation logic within the networking device. If, in element 806, a determination is made that the rate of change of state does exceed the threshold value, then the method continues in element 808 with rejecting the command instruction by the networking device. In some embodiments, a rejection of the command instruction causes the networking device to maintain its state at the state the networking device was in immediately prior to receiving the command instruction. In alternative embodiments, the networking device may remove itself from service in the network. However, if, in element 806, a determination is made that the rate of change of state does not exceed the threshold value and/or is less than the threshold value, then the method continues in element 810 with implementing, by the networking device, the change of state requested in the command instruction.

Figure 9:
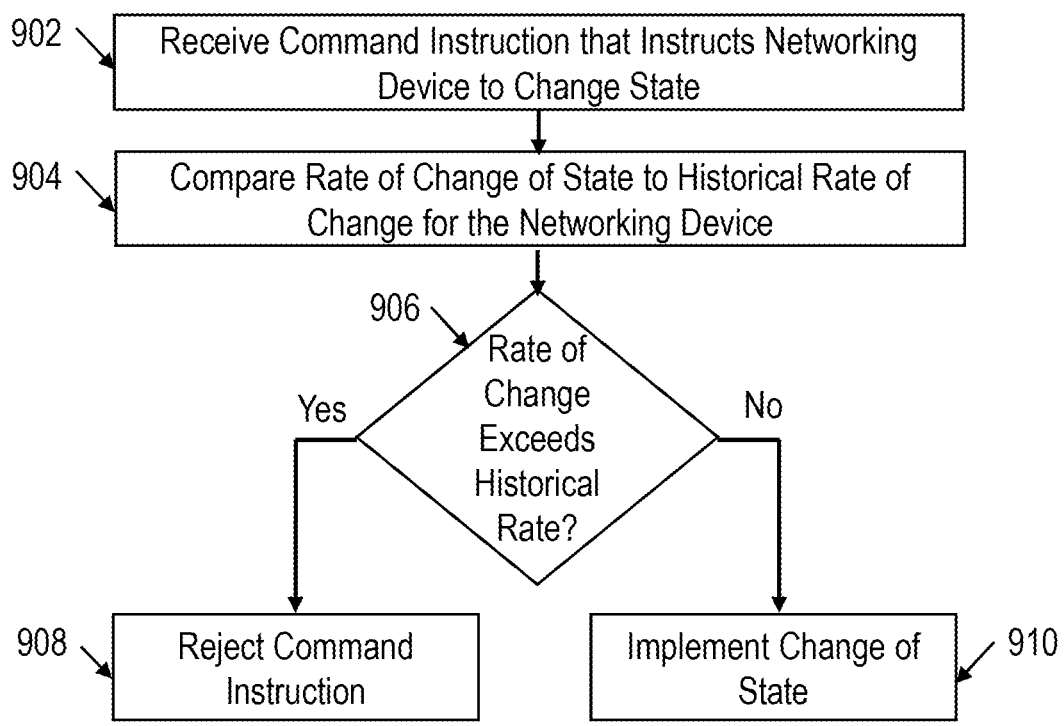
FIG. 9 shows a flow diagram illustrating aspects of operations that may be performed to implement a command instruction transmitted from a control plane to a data plane in a distributed computing environment, in accordance with various embodiments.

FIG. 9 shows a flow diagram illustrating aspects of operations that may be performed to implement a command instruction transmitted from a control plane to a data plane in a distributed computing environment, in accordance with various embodiments. In element 902 a command instruction that instructs a networking device, such as an edge device, to change state is received. The command instruction may be received by the networking device of a data plane in a distributed computing environment from a control plane of the distributed computing network. The command instruction may instruct the networking device to change state to a state corresponding to state information that is stored in the data store of the control plane. In element 904, the rate of change of state that is being requested in the command instruction is compared to a historical rate of change of state for the networking device. In some embodiments, this comparison is performed by validation logic within the networking device.

In element 906, a determination is made, in some embodiments by the validation logic, as to whether the rate of change of state being requested in the command instruction exceeds the historical rate of change of state for the networking device. If, in element 906, a determination is made that the rate of change of state does exceed the historical rate of change of state for the networking device, then the method continues in element 908 with rejecting the command instruction by the networking device. In some embodiments, a rejection of the command instruction causes the networking device to maintain its state at the state the networking device was in immediately prior to receiving the command instruction. In alternative embodiments, the networking device may remove itself from service in the network. However, if, in element 906, a determination is made that the rate of change of state does not exceed the historical rate of change of state for the networking device and/or is less than the historical rate of change of state for the networking device, then the method continues in element 910 with implementing, by the networking device, the change of state requested in the command instruction.

Figure 10:
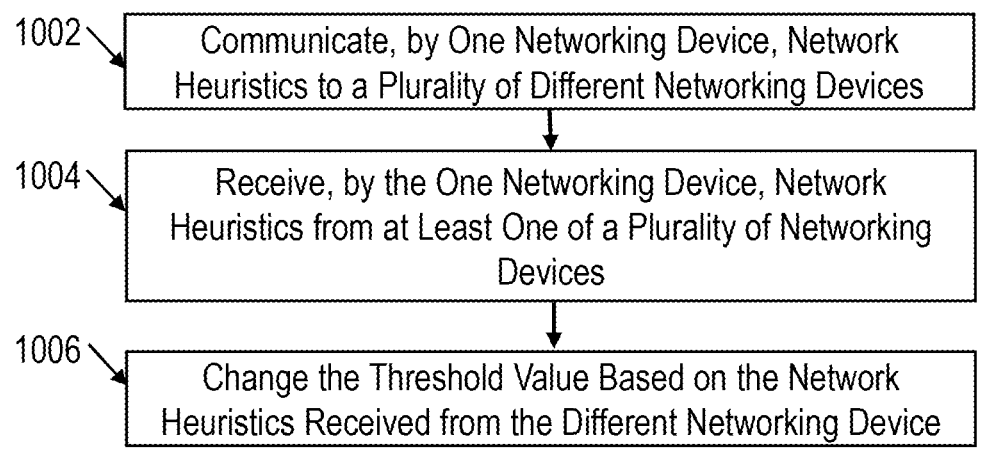
FIG. 10 shows a flow diagram illustrating aspects of operations that may be performed to communicate network heuristics from one edge device to another edge device in a data plane in a distributed computing environment, in accordance with various embodiments.

FIG. 10 shows a flow diagram illustrating aspects of operations that may be performed to communicate network heuristics from one networking device to another networking device in a data plane in a distributed computing environment, in accordance with various embodiments. In element 1002, one networking device communicates, e.g., transmits, network heuristics to a plurality of different networking devices (e.g., one edge device communicates network heuristics to multiple other edge devices). The network heuristics may include the rate of change of state for each respective networking device and each networking device's current state. These network heuristic communications from one networking device to one or more different networking devices may be pushed periodically, pushed based on an event trigger, and/or pulled based on a request by one or more of the different networking devices. For example, the networking device communicating the network heuristics may communicate to the different networking devices once every ten seconds. In other embodiments, the networking device may communicate the network heuristics based on a triggering event, such as every time it receives a command instruction and/or every time it accepts or rejects a command instruction. In yet other embodiments, the networking devices receiving the communication may request the network heuristics from the communicating networking device which, in response to the request, transmits the heuristics.

In element 1004, the one networking device receives network heuristics from at least one of the plurality of different networking devices. In element 1006, a threshold value for validating a command instruction that instructs the one networking device to change state is changed based on the network heuristics received from the different networking device. In an embodiment, the threshold value is changed by validation logic residing within each of the networking devices. Thus, network heuristics from one networking device may affect the threshold value for validating a command instruction sent to another networking device.

Figure 11:
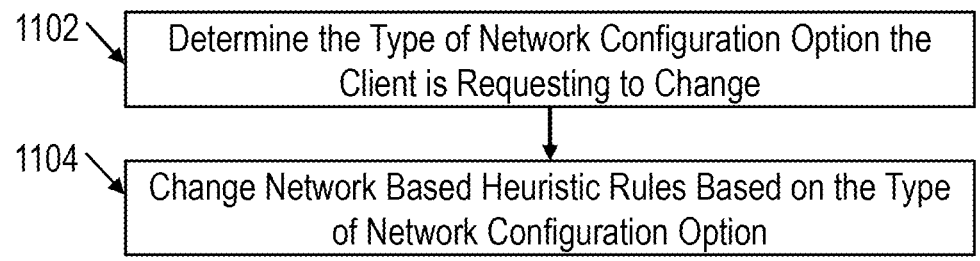
FIG. 11 shows a flow diagram illustrating aspects of operations that may be performed to change network based heuristic rules, in accordance with various embodiments.

FIG. 11 shows a flow diagram illustrating aspects of operations that may be performed to change network based heuristic rules, in accordance with various embodiments. In element 1102, a determination is made as to the type of network configuration a client is requesting to change in a distributed computer network. For example, a client may make network configuration changes to different types of networking information such as subroutes, subnets, elastic IP addresses, private IP addresses, etc. This determination may be performed by validation logic residing in an networking device. In element 1104, the network based heuristic rules are changed based on the type of network configuration associated with the client request. For example, each of the different types of networking information may have its own threshold value. Therefore, the threshold value may be one rate of change for the rate of change of subnets and a second threshold value for the rate of change in elastic IP addresses. Thus, the network based heuristic rules change based on the type of network configuration request the client is requesting change. The network based heuristic rules may be changed by the validation logic in the networking device.

Figure 12:
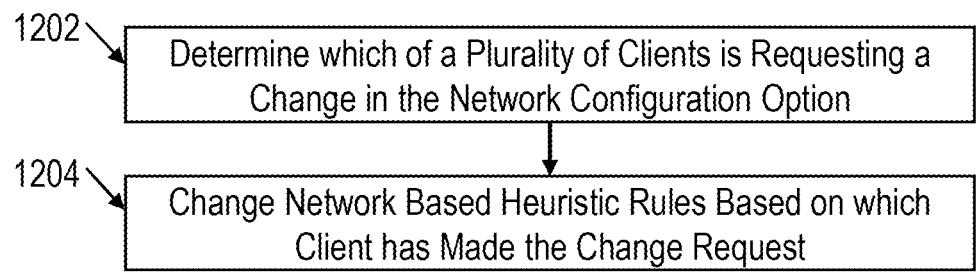
FIG. 12 shows a flow diagram illustrating aspects of operations that may be performed to change network based heuristic rules, in accordance with various embodiments.

FIG. 12 shows a flow diagram illustrating aspects of operations that may be performed to change network based heuristic rules, in accordance with various embodiments. In element 1202, a determination is made as to which of a plurality of clients is requesting a change in a network configuration for a distributed computer network. For example, many clients may have access to the distributed computer network. A determination is made as to which of those clients has requested a change in the network configuration. This determination may be performed by validation logic residing in a networking device. In element 1204, the network based heuristic rules are changed based on which of the clients has made the change in network configuration request. For example, each of the different clients may have different historical rates of change in state for the networking device. Thus, the threshold value for rate of change of state for the networking device may depend on which client has made the request to alter the state of the networking device. Thus, the network based heuristic rules change based on which client makes a request to change the network configuration. The network based heuristic rules may be changed by the validation logic in the networking device.

Figure 13:
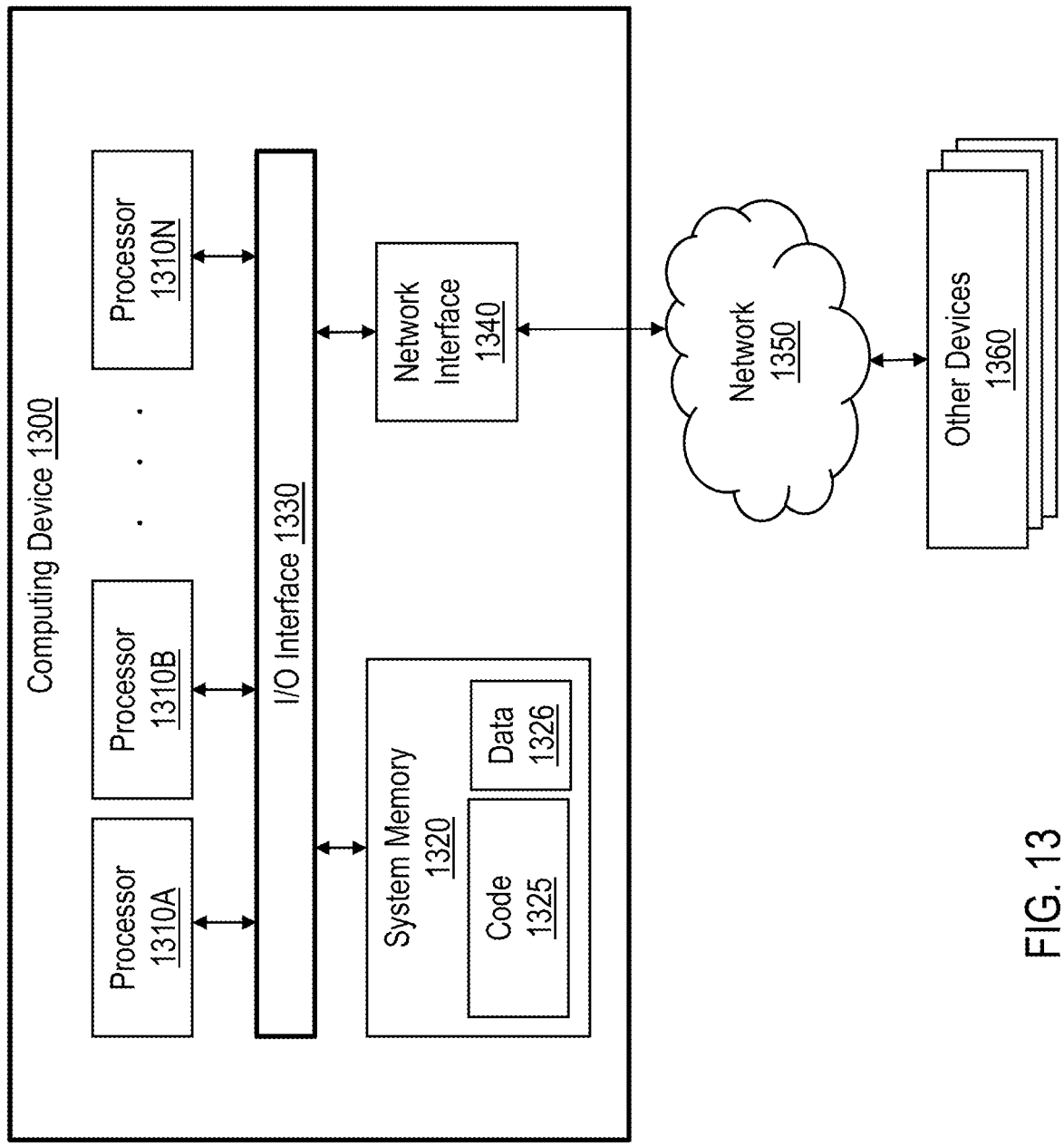
FIG. 13 shows a block diagram illustrating an example computing device, in accordance with various embodiments.

In at least some embodiments, a server that implements a portion or all of one or more of the technologies described herein, including the techniques to implement the control plane, distribution plane, data plane, and/or networking devices (e.g., edge devices), may include a general-purpose computer system that includes or is configured to access one or more computer-accessible media. FIG. 13 shows such a general-purpose computing device 1300. In the illustrated embodiment, computing device 1300 includes one or more processors 1310 coupled to a system memory 1320 via an input/output (I/O) interface 1330. Computing device 1300 further includes a network interface 1340 coupled to I/O interface 1330.

In various embodiments, computing device 1300 may be a uniprocessor system including one processor 1310, or a multiprocessor system including several processors 1310 (e.g., two, four, eight, or another suitable number). Processors 1310 may be any suitable processors capable of executing instructions. For example, in various embodiments, processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA. In some implementations, graphics processing units (GPUs) may be used instead of, or in addition to, conventional processors. In some embodiments, manager 210 and manager component 214 are implemented by processors 1310.

System memory 1320 may be configured to store instructions and data accessible by processor(s) 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1320 as code 1325 and data 1326

In one embodiment, I/O interface 1330 may be configured to coordinate I/O traffic between processor 1310, system memory 1320, and any peripheral devices in the device, including network interface 1340 or other peripheral interfaces such as various types of persistent and/or volatile storage devices used to store physical replicas of data object partitions. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computing device 1300 and other devices 1360 attached to a network or networks 1350, such as other computer systems or devices as illustrated in FIG. 1 through FIG. 12, for example. In various embodiments, network interface 1340 may support communication via any suitable wired or wireless general data networks, such as types of Ethernet network, for example. Additionally, network interface 1340 may support communication via telecommunications/telephony networks such as analog voice networks or digital fiber communications networks, via storage area networks such as Fibre Channel SANs, or via any other suitable type of network and/or protocol.

In some embodiments, system memory 1320 may be one embodiment of a computer-accessible medium configured to store program instructions and data as described above for FIG. 1 through FIG. 12 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1300 via I/O interface 1330. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 1300 as system memory 1320 or another type of memory. Further, a computer-accessible medium may include transmission media or signals such as electrical, electromagnetic, or digital signals, conveyed via a communication medium such as a network and/or a wireless link, such as may be implemented via network interface 1340. Portions or all of multiple computing devices such as that illustrated in FIG. 13 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A non-transitory computer-readable medium storing instructions that when executed on a computing system cause the computing system to:
   receive, by an edge device of a data interface of a distributed computing environment, a command instruction, generated by a control interface of the distributed computing environment, that instructs the edge device to change state to a state corresponding with a network configuration option for the edge device received at the control interface and stored in a data store of the control interface;
   validate, by the edge device, the state in the command instruction utilizing network heuristic based rules by determining that a rate of change in state at the edge device is less than a threshold value; and
   implement, by the edge device, the network configuration option based on a determination that the state is valid.

2. The computer-readable medium of claim 1, wherein the edge device communicates network heuristics to a plurality of different edge devices.

3. A system comprising:
   one or more processors; and
   memory including instructions that, upon being executed by the one or more processors, cause the one or more processors to:
   receive, by a networking device of a data interface of a computing environment, a command instruction that instructs the networking device to change state to a state corresponding with a requested state stored in a data store of a control interface of the computing environment, that, when implemented by the networking device, implements a network configuration option;

determine, by the networking device, whether the state in the command instruction is valid by utilizing network heuristic based rules, the state in the command instruction being valid if a rate change in state at the networking device is equal to or less than a threshold value and not valid if the rate of change in state at the networking device exceeds the threshold value; and reject, by the networking device, the command instruction based on a determination that the state is not valid.

4. The system of claim 3, wherein the instructions, upon being executed, further cause the one or more processors to remove from service the networking device based on the determination that the state is not valid.

5. The system of claim 3, wherein the rejection of the command instruction precludes implementation of the network configuration option.

6. The system of claim 5, wherein the instructions, upon being executed, further cause the state of the networking device to be maintained at the same state present in the networking device immediately prior to receipt of the command instruction.

7. The system of claim 3, wherein the network heuristic based rules are based on which of a plurality of clients requests the change in network configuration option.

8. The system of claim 7, wherein a threshold value for the network heuristic based rules is based on which of the plurality of clients requests a change in the network configuration option.

9. The system of claim 3, wherein the instructions, upon being executed, further cause the network heuristic based rules to change based on which of a plurality of types of network configuration options a client requests to be changed.

10. The system of claim 3, wherein the threshold value is based on an historical rate of change in state at the networking device.

11. The system of claim 3, wherein the instructions, upon being executed, further cause the networking device to receive network heuristics from a plurality of different networking devices.

12. The system of claim 11, wherein the threshold value is based on a rate of change in state of the plurality of different networking devices.

13. A method, comprising:

receiving, by a networking device of a distributed computing environment, a plurality of command instructions that instruct the networking device to change state to a state corresponding with state information stored in a data store of a control interface of the distributed computing environment that, when implemented by the networking device, implements a network configuration option received from a client at the control interface;

determining, by the networking device, whether the state information in a first of the plurality of command instructions is valid by utilizing network heuristic based rules, the state in the command instruction being valid if a rate change in state at the networking device is equal to or less than a threshold value and not valid if the rate of change in state at the networking device exceeds the threshold value; and rejecting, by the networking device, the first command instruction based on a determination that the state information is not valid.

14. The method of claim 13, further comprising, implementing, by the networking device, a second of the plurality of command instructions based on a determination that the state information is valid.

15. The method of claim 13, further comprising:

communicating, by the networking device, network heuristics to a plurality of different networking devices; and receiving, by the networking device, different network heuristics from at least one of the plurality of networking devices.

16. The method of claim 13, further comprising, changing the network heuristic based rules based on (a) which of a plurality of clients requests a change in the network configuration option or (b) which of a plurality of types of network configuration options the client requests to be changed.

17. The method of claim 13, wherein the network configuration option received from the client includes (a) a subroute, (b) a subnet, (c) an elastic IP address, or (d) a private IP address.

18. The method of claim 13, wherein the threshold value is based on an historical rate of change in state at the networking device.

* * * * *